United States Patent [19]
Pfeffer

[11] 4,345,683
[45] Aug. 24, 1982

[54] CONVEYOR FOR LABELLING APPARATUS

[75] Inventor: George B. Pfeffer, Minnetonka, Minn.

[73] Assignee: Datafile Limited, Willowdale, Canada

[21] Appl. No.: 140,816

[22] Filed: Apr. 28, 1980

[51] Int. Cl.³ .............................................. B65G 47/86
[52] U.S. Cl. ...................................... 198/653; 74/110; 198/696; 271/204; 271/277
[58] Field of Search .............. 271/204, 206, 277, 250; 198/479, 486, 650, 653, 695, 696; 226/173; 74/110, 327; 292/140, 170

[56] References Cited

U.S. PATENT DOCUMENTS

| 831,745 | 9/1906 | Rice | 74/527 X |
|---|---|---|---|
| 2,061,448 | 11/1936 | Bath et al. | 74/110 |
| 3,809,390 | 5/1974 | Lenoir | 271/204 |

*Primary Examiner*—Robert B. Reeves
*Assistant Examiner*—Douglas D. Watts

[57] ABSTRACT

A conveyor is disclosed for labelling apparatus. The conveyor comprises a plurality of clamps and endless carrier for the clamps. Each clamp is urged to a closed position by a spring and is adapted to be held in an open position for receiving an unlabelled folder. Means closes each clamp to grip sheet material and hold it while it is being labelled for purposes of accurate receipt of applied labels. The body portion presents a base which supports clamped material. A moveable clamp jaw is secured to a member which is adapted to slide in and out of the body portion. The spring means is associated with the member to urge the clamp jaw towards the clamp base. The member has mounted thereon, remote from the jaw, a roller means adapted to rotate about an axis perpendicular to the longitudinal axis of the member. A slider cam is laterally moveable in the body portion and is in contact with the roller. The slider cam has upper and lower cam segments to provide respectively open and closed positions for the clamp. The cam upper segment has a depressed area to catch the roller means and hold said clamp open against closure pressure exerted by the spring. Means is provided for opening and closing the clamps as the conveyor moves.

15 Claims, 8 Drawing Figures

CONVEYOR FOR LABELLING APPARATUS

FIELD OF THE INVENTION

This invention relates to a conveyor system for conveying sheet material and the like, such as folders. The conveyor system may be used in association with labelling apparatus to convey material to be labelled.

BACKGROUND OF THE INVENTION

It is widely accepted that the colour coding labelling of file folders of a filing system significantly improves the efficiency of the system. Such systems may be that as described in U.S. Pat. No. 3,504,907. File labelling techniques have been recently improved where, for example, in a colour coded system, the labels may be machine read to facilitate electronic control of the filing system. Such a system may be that as described in copending U.S. patent application Ser. No. 775,687. In order to apply labels to folders, it is important to ensure accurate placement of each label on the folder to present a proper colour scheme along folder edge in the colour coded filing system.

An apparatus for applying labels to folders is disclosed in U.S. patent application Ser. No. 830,118. In that system a file folder is placed on a conveyor, the folder is conveyed past a plurality of labellers and, in accordance with a predetermined program, the labellers are controlled to apply a series of labels to the folders. When the folder is discharged from the labelling apparatus, the series of labels is in accordance with a predetermined scheme to present the desired colour array along folder edge. The conveyor of the labeller disclosed in that patent application uses a pair of clamps to grip each folder, which is placed on the conveyor, and hold the folder during application of labels to it. Although the clamps of the conveyor system are satisfactory for ensuring accurate holding of a folder, problems have arisen with respect to maintenance of the conveyor clamp, wear and tear on the conveyor belt which carries the clamp due to opening and closing of the clamps causing flexing of the conveyor belt at its joints and the inability to operate at higher speeds for labelling folders.

Other approaches to clamping thin articles on a conveying mechanism are disclosed in Canadian Pat. Nos. 576,390 and 1,006,194. The latter Canadian patent discloses the use of a spring clamp system, where the spring is used to maintain the clamp in its normally open position. A cam arrangement is used in combination with a roller secured to the clamp jaw arm to draw the clamp shut and, by use of a pawl, hold the clamp in the closed position against the opening force exerted by the spring.

In Canadian Pat. No. 576,390, a clamping mechanism is disclosed having a pivoted clamping jaw which is urged to its closed position by a tension spring, which acts on a laterally moveable U-shaped arm. The U-shaped arm has a depending roller which is engaged by a cam to move it laterally of the conveyor to either open or close the pivotally mounted jaw. A continuous length of cam must be provided to maintain the clamps open at needed locations along the conveyor. Due to the linkage mechanism arrangement, a relatively large tension spring must be used to exert sufficient clamping force to secure sheet-like material to the conveying mechanism. The arrangement, due to the linkage, is complex and susceptible to frequent maintenance and breakage. In addition, it adds to the bulkiness of the conveyor and increases the lateral extent of the conveyor, because the U-shaped arms envelope the side of the conveyor.

SUMMARY OF THE INVENTION

The clamping mechanism, according to this invention, for use on conveyors, provides a compact clamping unit for the conveyor and does not increase the useable width of the conveyor. The clamp is biased to a closed position, yet may be held in an open position by a catch means for receipt of an article. The opening and closing of the clamp is accomplished by exerting force on the clamp actuating mechanism in a direction which does not flex appreciably the carrier of the conveyor system to substantially reduce the likelihood of inducing stress cracks and the like in the conveyor carrier, which may be of spring steel.

A conveyor for conveying articles such as sheet material, according to an aspect of this invention, comprises a plurality of clamps for gripping sheet material and conveying same. The conveyor has a looped endless carrier to which the clamps are secured in an evenly spaced-apart manner along conveyor length to receive unlabelled folders between clamps. Each clamp is urged to a closed position by a spring means and is adapted to be held in its open position. Means is provided for opening the clamp to its held-open position and means is provided for releasing the clamp from its held-open position to close it under spring pressure.

According to a more detailed aspect of the invention, the clamp comprises a body portion which is connected to the carrier. The body portion has a base which supports clamped sheet material. A moveable clamp jaw is secured to a member which is adapted to slide in and out of the body portion. Spring means is associated with the member to urge the clamp jaw towards the clamp base at all times. This slidable member has mounted thereon, remote from the jaw, a roller adapted to rotate about an axis perpendicular to the longitudinal axis of the member. A slider cam is provided in the body portion and is laterally moveable therein and is in contact with the roller of the slidable jaw member. The slider cam has upper and lower cam segments to define respectively open and closed positions for the clamp, by moving the member to the extent predetermined by the cam configuration.

The cam upper segment has a depressed area to catch the roller means and hold the clamp open against closure pressure exerted by the spring means. The means for opening the clamp is positioned on the conveyor to move the cam laterally and position the roller on the upper cam segment and, thereby release a labelled article. The means for closing the clamp is positioned on the conveyor to move the cam laterally and position the roller on the lower cam segment to close the clamp to grip an article by the closure pressure of the spring means.

The clamp, according to this invention, is opened and closed by means which move the slider cam transversely of the carrier. During the opening and closing of the clamps no upward force is exerted on the carrier which would cause it to flex. The spring cooperates with the slider cam in a manner to provide a catch which holds the clamp in the open position preparatory to receiving an unlabelled article. The action of the spring means assists in the closure of the clamp, because it continually urges the clamp to the closed position. Thus, when the slider cam is moved laterally to release the roller from the upper cam segment, the clamp readily closes under spring pressure and, due to the roller engagement, continues to force the slider cam laterally.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
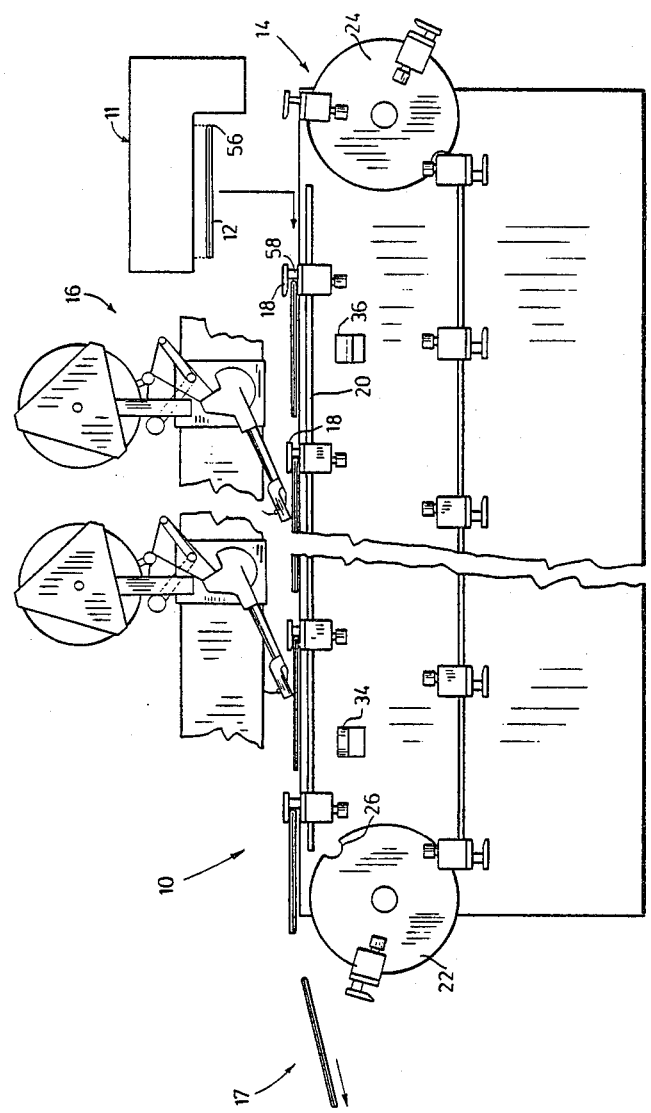
FIG. 1 is a side elevation showing a preferred embodiment for the conveyor system as used with a folder labelling apparatus.

The labelling apparatus 10, as shown in FIG. 1 of the drawings, is used to apply labels to sheet material in the form of folders 12. The folders may be of the type commonly used in file systems. A folder 12 is placed on the conveyor generally designated 14 by a folder placement device 11, conveyed beneath a plurality of labellers generally designated 16 and discharged at 17 with the label array. The device 11 for placing folders on the conveyor may be of the type described in copending U.S. patent application Ser. No. 830,118. A device (not shown) may be located upstream of the discharge end of the conveyor to effect any needed folding or securing of applied labels to the folders.

An example of a labelling apparatus, in association with which the conveyor according to this invention may be used, is described in copending U.S. patent application Ser. No. 830,118.

When applying labels to folders, where it is necessary to ensure that each label is applied precisely to a particular location on the folder, it is important for the conveyor's system to firmly hold the folder in a particular position relative to conveyor movement, so that as each label is applied, it may be precisely located by proper timing of the labellers. To ensure this consistent conveying of folders, clamps are provided on the conveyor to grip the folders as they are placed onto the conveyor.

Figure 5:
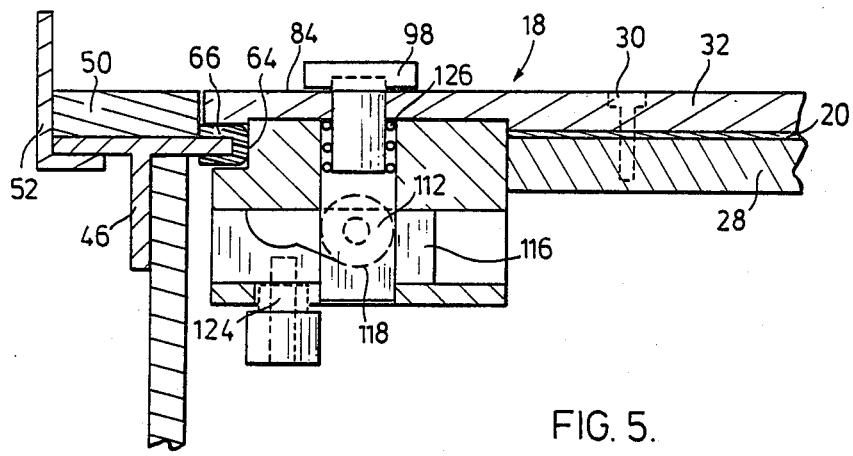
FIG. 5, which appears with FIG. 3, is a section through the clamp as secured to conveyor carrier and shown in its closed position.

To ensure an equal spacing between folders, as conveyed, the clamps 18 are secured to a conveyor carrier 20 at precisely equal spacing along conveyor length. According to this embodiment, the spacing may be conveniently twelve inches between each set of clamps 18 on the conveyor belt to accommodate a standard folder size. The conveyor belt 20 is trained about spaced-apart sprockets or wheels 22 and 24. Wheel 22 may be driven by an electric motor, the speed of which is accurately controlled. The conveyor wheels 22 and 24 may be provided with semi-circular shaped notches 26 which mesh with bars extending between the clamps 18 transversely of the belt and on the underside of the belt to effect an interengagement between conveyor belt and drive wheel 22 so that the speed of the conveyor may be consistently controlled. Reference to FIG. 5 of the drawings shows the bar portion 28, which is located beneath the conveyor belt 20. Allan bolts 30 are used to secure the conveyor belt 20, as sandwiched between bar 28 and clamp support member 32. The technique of fastening is also shown in FIG. 2 of the drawings where the Allan screws 30 extend through the clamp support member 32.

As demonstrated in FIG. 1, the clamps of the conveyor are urged to a closed position as they grip conveyed folders, yet may be moved to an open position and held in that position until an unlabelled folder is placed on the conveyor ready for pick-up. To effect opening and closing of the clamps in this embodiment, cam members 34 are used to open the clamps to facilitate discharge of labelled folders and cam members 36 are used to close the clamps on unlabelled folders to hold same, as conveyed for receipt of labels from labellers 16. As a result, the conveyor clamps, once opened by cams 34, remain in the held open position as they return to conveyor receiving end in readiness to receive a new folder and clamp same when contacted by cams 36.

Figure 2:
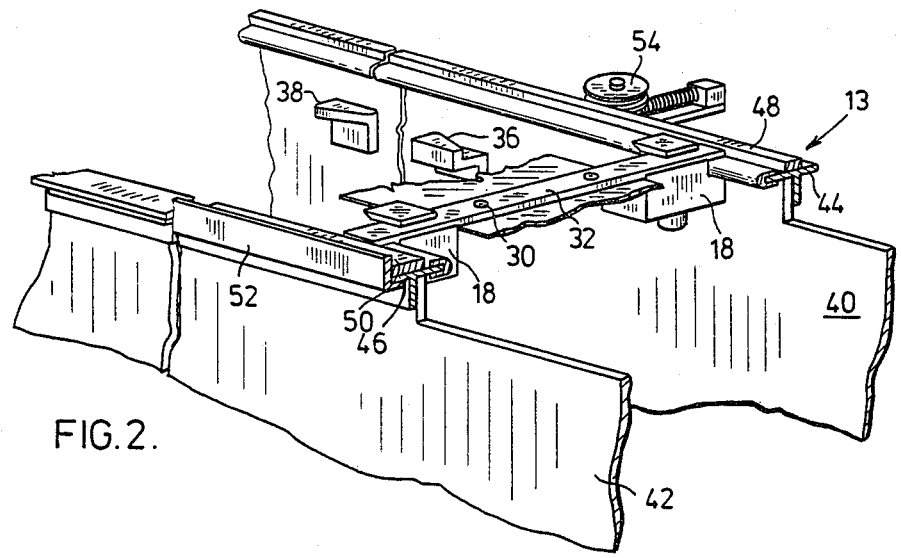
FIG. 2 shows the receiving and discharge ends of the conveyor with a folder about to be placed on the conveyor.
Figure 3:
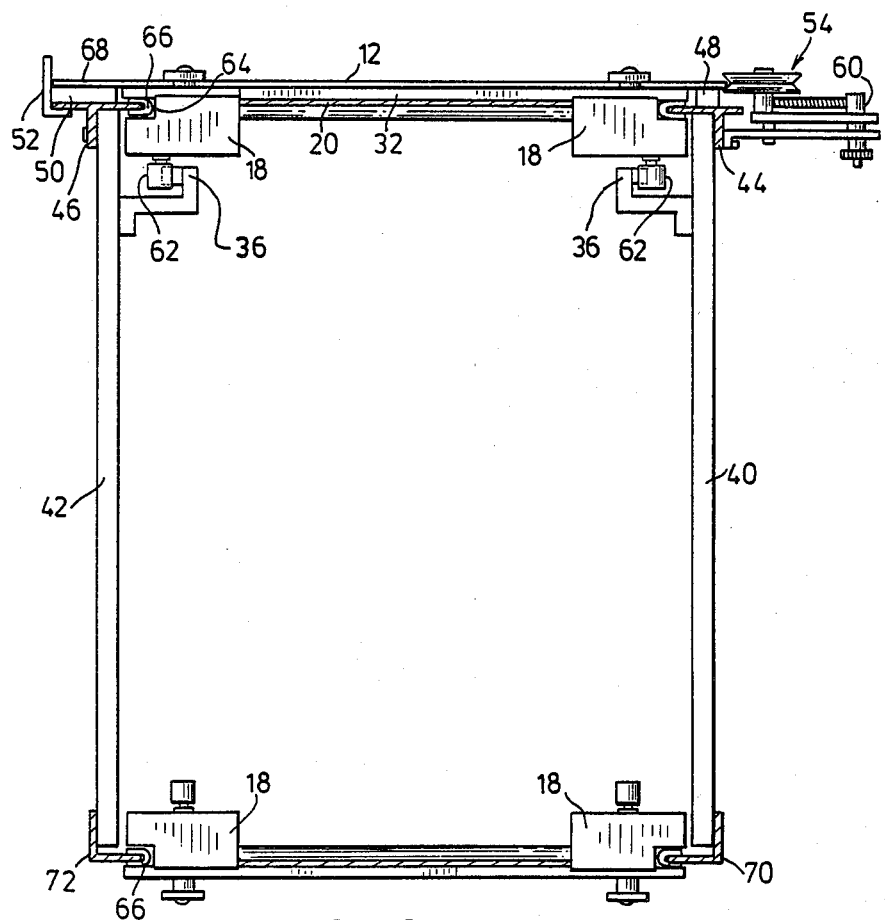
FIG. 3 is a cross-section through the conveyor at the receiving end.

Turning to FIG. 2, the receiving and discharge ends 13 and 15 of the conveyor are shown with the closure cams 36 and opening cams 38 secured to conveyor side frames 40 and 42. These are secured to the main frame of the labelling apparatus 10. The upper edges of the conveyor frame support longitudinally extending T-shaped members 44 and 46 which provide a base on which friction reducing material 48 and 50 are located. The folders, as placed on the conveyor, glide over the friction reducing material 48 and 50 as they are clamped by clamp members 18. To ensure accurate positioning transversely of the conveyor, as each folder is placed thereon, the T-shaped member 46 has secured thereto an L-shaped member 52 with its upright portion being spaced above the glide material 50. Opposite the L-shaped member 52 is a spring loaded wheel 54 which serves to push a folder, as placed on the conveyor, toward and to contact L-shaped member 52 as the roller rotates. This ensures a consistent, transverse positioning of folder on conveyor and, due to the frictional engagement between the L-shaped member and the folder edge, causes a slight drag in the movement of the folder. As shown in FIG. 1, this resistance to folder movement serves to position the base edge 56 of a folder 12 against the raised shoulder 57 of the clamps to always ensure a consistent positioning of the folder base portion 56 relative to the conveyor bed. Referring to FIG. 3, the relationship of the L-shaped member 52 relative to the spring-loaded wheel 54 is shown. The adjustment of the spring loaded wheel is achieved by an adjustment device 60. The clamp closure members 36 are positioned to close the clamps by contacting rollers 62 on the underside of the clamps after the folder edge 56 is against the shoulders 57. It is appreciated that other devices may be used to position the folder in the clamps prior to clamp closing. Opposing cam operated units alongside the conveyor may be used to engage both sides of the folder to precisely position the folder in the clamps. The opposing units may travel along with a folder a short distance while establishing the folder position. In order to induce a slight drag in folder movement relative to the conveyor to place the folder edge against the clamp shoulder 57, the units may travel at a linear speed slightly slower than that of the clamps to drag the folder edge back against the shoulders 57.

The clamps 18 include channel portions 64 which receive edge portions of members 44 and 46. The edge portions are covered with friction-reducing material 66. This provides a guide for the clamps, as secured to the carrier band 20 beneath the support plate 32 for the clamps. This ensures that the folder remains essentially horizontal during application of labels to the folder, which is usually along the margin portion 68 of folder 12. To accommodate the return of the clamps 18 to the receiving end of the conveyor, it is shown that the bottom portions of conveyor frames 40 and 42 include L-shaped members 70 and 72 which have the same friction-reducing material 66 to guide and retain the conveyor underside on track.

Figure 6:
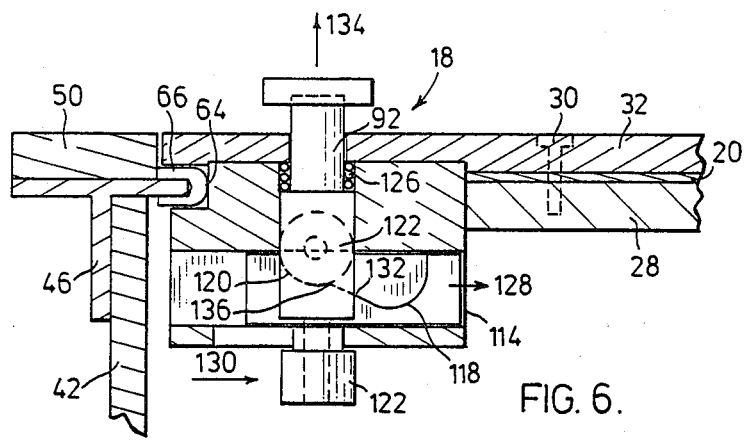
FIG. 6, which appears with FIG. 2, is the same section as in FIG. 5 showing the clamp in its open position.
Figure 4:
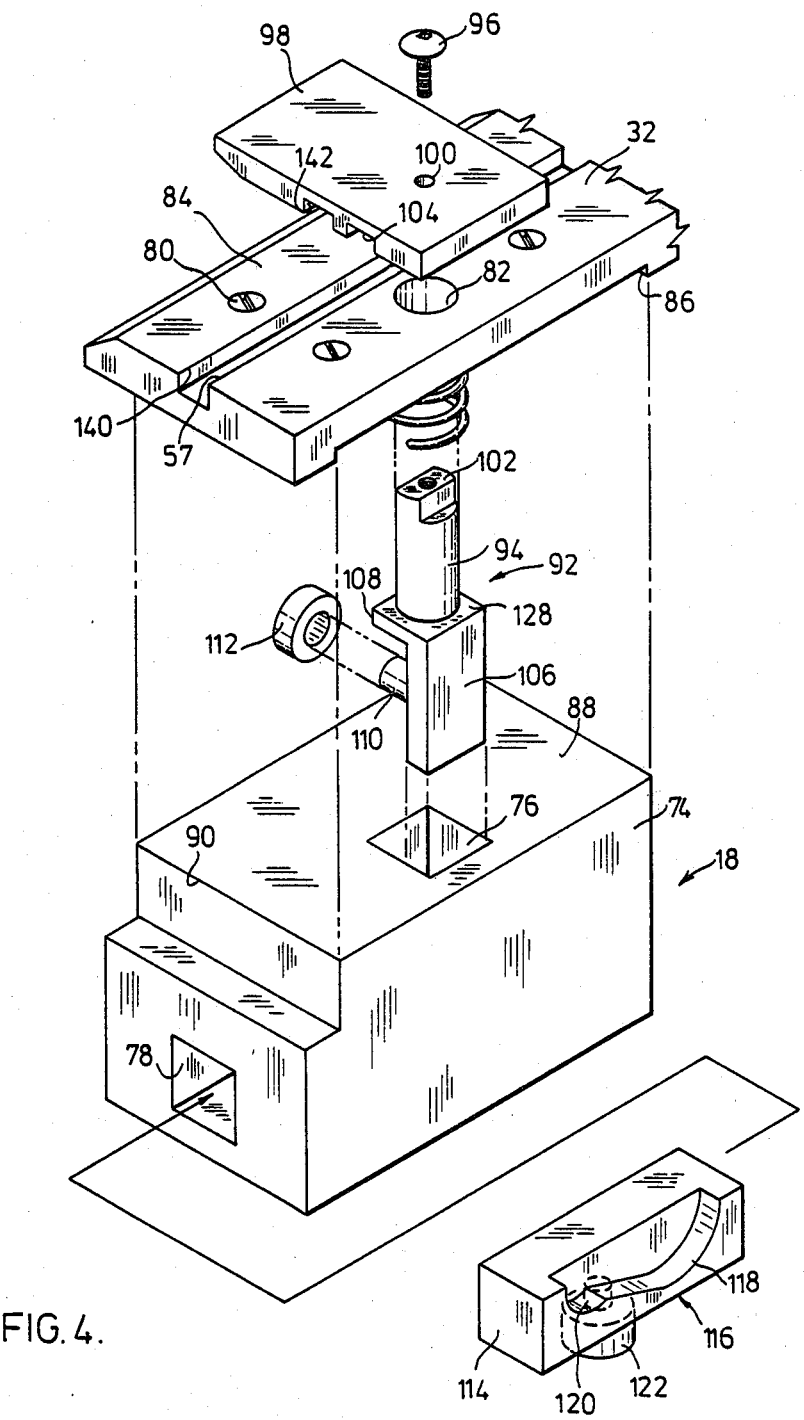
FIG. 4 is an exploded view of a clamp, according to a preferred embodiment of the invention.

Referring to the internal parts of the clamp device 18, as shown in FIG. 4, the clamp has a body portion 74 which may be formed of an appropriate rigid plastic material or metal, such as aluminum. The body portion 74 has formed therein a first channel 76 which extends therethrough. A second channel 78 is formed in the body portion 74 and extends in a direction perpendicular to the longitudinal axis of the channel 76 and intersects that channel in the lower portion of the body 74. Secured to the top of the body portion 74 is the clamp support bar 32 which, in this embodiment, extends transversely of the conveyor belt 20 and is secured thereto as shown in FIG. 6 by Allan screws 30. The clamp support 32 is secured to the body 74 by way of bolts 80 which are threaded into the body portion 74. The support member 32 forms the base 84 for the clamp on which the folder rests. To ensure a secure fastening of the plate 32 to the block portion 74, the underside of the plate 32 is recessed at 86 to snugly receive the edges 88 and 90 of the block 74.

To facilitate a secure gripping of the folder between the clamp jaw 98 and the base 84, matingly formed grooves 140 and 142 accommodate the larger bulge portion of the folder edge.

An aperture 82 in plate 32 is aligned with the channel 76. Positioned in the channel 76 is a slidable member 92 which moves upwardly and downwardly along its longitudinal axis. A post 84 extends upwardly through aperture 82 and is secured by way of bolt 96 to the underside of clamp jaw 98 through aperture 100 formed therein. The upper portion of the post 94 is squared off at 102 to fit within the channel portion on the underside of jaw 98 to prevent the jaw 98 rotating relative to the plate 32. The lower portion of the slidable member 92 has a depending leg 106 which is rectangular in shape and fits in slidable relation to channel 76 to provide the needed guidance as the face of the leg abuts and slides along one face of the channel, while another face 108 of the member slides along the opposing face of channel 76. Mounted on the inside of the depending leg 106 is a spindle 110 which has rotatably mounted thereon a wheel 112.

Positioned in channel 78 is a slider cam 114 which is shaped to telescope within and slide back and forth in the channel 78. The wheel 112 rides on the cam configuration 116 of the slider which has lower cam segment 118 and upper cam segment 120. The movement of the slider 114 to and fro with the roller engaged therewith defines, when the roller is on the lower cam segment 118, the closed position for the clamp jaw 98 relative to base 84 and when on the upper cam segment 120 defines the open position of clamp jaw 98 relative to base 84. Secured to the underside of the slider 114 is a roller 122 which is rotatably mounted on a post 124.

Turning to FIG. 5, the roller 112 is shown resting on the lower cam segment 118 where, under the pressure of compression spring 126 which is confined between the faces 128 of slidable member 92 and the underside of plate 32, exerts a clamping force between clamp jaw 98 and base 84 of plate 32. Thus, anything between clamp jaw 98 and base will be firmly held by the clamp under pressure of the compression spring 126. The relative positioning of the lower cam segment 118 is such to ensure that, with nothing between the clamp jaws, the jaw 98 abuts the base 84 under spring pressure.

In order to open the clamp 18, the slider cam 114 must be moved laterally of the conveyor in the direction of arrow 128, so as to position the roller 122 in the upper cam segment 120. To accomplish this, the opening cam means 38 contacts the roller 122 and shifts it inwardly of the conveyor in the direction of arrow 130, to effect the desired movement of the slider 114 in the direction of arrow 128. As this motion takes place, the roller rolls up the ramp portion 132 of the lower cam segment 118 to elevate member 92 in the direction of arrow 134. Corresponding with this upward movement of member 92, the compression spring 126 is compressed; however, the use of the ramp portion 132, which preferably has an angle of inclination between 10° and 35°, substantially reduced the force needed to move the member 92 upwardly against the spring pressure of spring 126. The inward extent of the cam 38 is such to ensure that the slider 116 is moved over sufficiently to cause the roller 122 to move up over apex 136 of the cam 116 and drop into the depressed portion of upper cam segment 120. In so doing and in combination with the action of the compression spring 126, the roller 122, as caught in the upper cam segment, constitutes a catch to hold the clamp jaws open until the roller is moved out of the upper cam segment. According to this embodiment, the configuration of the upper cam segment 120 mates with the peripheral configuration of the roller 122 to ensure smooth receipt of the roller therein.

To effect a closure of the clamp, cam portion 36 contacts the roller 122 causing the slider cam 114 to move in a direction opposite to arrow 128. As the roller moves up over apex 136, it moves down onto ramp 132 and under the force of the spring 126, continues its downward movement until the article is firmly held by the clamp 18.

Figures 7, 8:
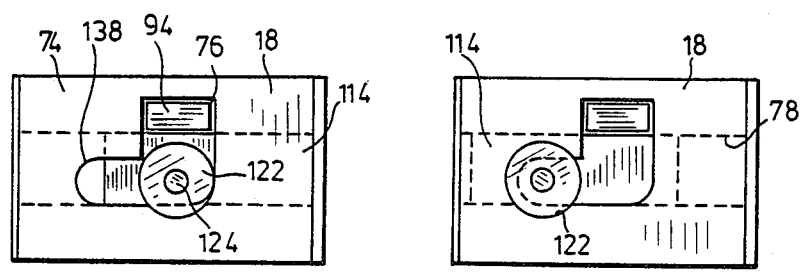
FIG. 7, which appears with FIG. 2, is a bottom view of the clamp in its opened position.
FIG. 8, which appears with FIG. 2, is a bottom view of the clamp when in its closed position.

Turning to FIGS. 7 and 8, the bottom views of the clamp 18 demonstrate the relative positions of the roller 122. Referring to FIG. 7, a slot 138 is provided in the bottom portion of the body 4 of the clamp to accommodate the lateral movement of the roller 122 by way of its connection through post 124 to the slider 114, as shown in dot. The position, as shown in FIG. 7, is for the open position where the slider is correspondingly at the extreme right position, as shown in dot.

Referring to FIG. 8, the cam 36 has moved the roller laterally to position the slider 114 at the opposite extreme position shown in dot.

It is thus apparent from the described operation of this clamp device that a lateral force, as exerted on the actuation device 122 of the clamp, effects the desired opening and closing where no upward force is directed on the carrier belt 20 of the conveyor. Thus, when a folder is placed onto the conveyor, it slides smoothly into the clamp area and no upward movement is induced in the folder as the clamps are being closed by the lateral forces exerted on the clamp closure.

The conveyor carrier 20 may be formed of spring steel and may be in sections of a length, in terms of multiples of the spacing between clamps. Thus, the sections of carrier may be joined between the clamp supports 32 and the bars 28 by bolts 30.

With this arrangement, higher conveying speeds of folders may be attained. This is partly due to the positive action of clamping the folder and the holding open of the clamps with the catch device.

It is appreciated that only one series of clamps may be used in association with a conveyor which may clamp articles in the form of sheet material other than file folders, such as tape to be conveyed beneath labellers and discrete sections thereof labelled. Such labelled tape may be re-rolled and the discrete portions thereof cut into independent portions at a later time to provide discrete label schemes for products. In addition, it is understood that the upper jaws 98 of the clamp may be joined entirely across the folder base to provide a more secure clamping. The opening and closing of the clamps may be actuated by the two rollers, or a single roller may be positioned centrally of the conveyor and actuated by appropriately positioned cam segments 36, 38 for opening and closing. It is also understood that other types of devices may be used to actuate the opening and closing of the clamp by moving the slider mechanism 114 in another manner.

Although various embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. In apparatus for labelling sheet material, a conveyor comrising a plurality of pairs of clamps secured to a looped endless carrier, the clamps of each pair of clamps being spaced apart transversely of said carrier and secured along respective sides of said carrier, each clamp of said pair having means for biasing said clamp to a closed position and means for holding said clamp in its open position, means to each carrier side for opening said pairs of clamps in their held-open position and means to each carrier side for releasing said pairs of clamps from their held-open position to close said clamps under pressure of said biasing means to grip sheet material which has been placed on said conveyor and hold it while being labelled, said holding means including a catch where said means for opening said clamps and said means for closing said clamps exert forces on each pair of said clamps which are laterally directed relative to said carrier toward one another or away from one another in opening and closing said clamps to balance thereby forces on said carrier and maintaining carrier alignment during opening and closing of each pair of clamps.

2. In apparatus of claim 1, said clamp comprising a body portion which is secured to said carrier, said body portion having a base which supports clamped sheet material, a moveable clamp jaw secured to a member which is adapted to slide in and out of said body portion, said biasing means being a spring means associated with said member to urge said clamp jaw towards said clamp base, said member having mounted thereon remote from said jaw, a roller adapted to rotate about an axis perpendicular to the longitudinal axis of said member, a slider cam laterally moveable in said body portion and in contact with said roller, said slider cam having upper and lower cam segments to define respectively open and closed positions of said clamp by moving said member to the extent predetermined by cam configuration, said cam upper segment having a depressed area to catch said roller means and hold said clamp open against closure pressure exerted by said spring means, said means for opening said clamp being positioned on said conveyor to move said cam laterally and position said roller on said upper cam segment and thereby release labelled sheet material and said means for closing said clamp being positioned on said conveyor to move said cam laterally and position said roller on said lower cam segment to close said clamp to grip sheet material by the closure pressure of said spring means.

3. In apparatus of claim 2, said slider cam having secured thereto a roller adapted to rotate about an axis parallel to said member longitudinal axis, said roller being exterior of said body portion, said means for closing said clamp comprising a first cam mounted on said conveyor for moving said slider cam in a first direction to position said roller on said lower cam segment and said means for opening said clamp comprising a second cam mounted on said conveyor for moving said slider cam in an opposite second direction to position said roller on said upper cam segment.

4. In apparatus of claim 3, said cam being positioned on said conveyor downstream of the area at which sheet material is placed thereon, said second cam being positioned on said conveyor upstream of the area where labelled sheet material is discharged.

5. In apparatus of claim 1, said carrier being trained over a pair of spaced-apart wheels, said carrier being adapted to be driven by one of said wheels to convey clamped folders at a desired speed.

6. In apparatus of claim 2 adapted to label sheet material in the form of folders, said carrier of the conveyor having said clamps secured thereto in an evenly spaced-apart manner along conveyor length to receive unlabelled folders between clamps.

7. In apparatus of claim 6, means for positioning on said conveyor a folder, which has been placed thereon prior to means closing said clamp on such folder.

8. In apparatus of claim 6, the body portion of each clamp being secured to a support member which extends transversely of and is secured to said carrier, each support member, as secured to said carrier, determining the spacing along the conveyor between each pair of clamps.

9. In apparatus of claim 8, said support member cooperating with conveyor frame to support said pairs of clamps while clamped folders are being labelled.

10. In apparatus for labelling folders, a conveyor comprising a plurality of pairs of clamps secured to a looped endless carrier and evenly spaced apart along conveyor length to receive unlabelled folders between clamps, the clamps of each pair of clamps being spaced apart transversely of said carrier and secured along respective sides of said carrier, each clamp of said pair having means for biasing said clamp to a closed position and means for holding said clamp in its open position, means to each carrier side for opening said pairs of clamps in their held-open position and means to each carrier side for releasing said pairs of clamps from their held-open position to close said clamps under pressure of said biasing means to grip sheet material which has been placed on said conveyor and hold it while being labelled, said holding means including a catch where said means for opening said clamps and said means for closing said clamps exert forces on each pair of said clamps which are laterally directed relative to said carrier toward one another or away from one another in opening and closing said clamps to balance thereby forces on said carrier and maintaining carrier alingment during opening and closing of each pair of clamps, said clamp comprising a body portion which is secured to said carrier, said body portion having a base which supports clamped folders, a moveable clamp jaw secured to a member which is adapted to slide in and out of said body portion, said body portion, said biasing means being a spring means associated with said member to urge said clamp jaw towards said clamp base, said member having mounted thereon remote from said jaw, a roller adapted to rotate about an axis perpendicular to the longitudinal axis of said member, a slider cam laterally moveable in said body portion and in contact with said roller, said slider cam having upper and lower cam segments to define respectively open and closed positions of said clamp by moving said member to the extent predetermined by cam configuration, said cam upper segment having a depressed area to catch said roller means and hold said clamp open against closure pressure exerted by said spring means, said means for opening said clamp being positioned on said conveyor to move said cam laterally and position said roller on said upper cam segment and thereby release each labelled folder and said means for closing said clamp being positioned on said conveyor to move said cam laterally and position said roller on said lower cam segment to close said clamp to grip each folder by the closure pressure of said spring means, said body portion of each clamp having a first channel extending therethrough and a second channel extending perpendicular to said first channel and intersecting same, said slider cam being adapted to slide in said second channel and said member being adapted to slide up and down in said first channel with said roller in contact with said cam segments, a slot provided in the base of said body portion in communication with said second channel, a depending post being secured to said slider cam and extending through said slot and a second roller being rotatably mounted on said post about an axis parallel to said member longitudinal axis, said means for opening and closing said clamp being adapted to contact said second roller and shift it in a direction which causes said slider cam to either open or close said clamp.

11. In apparatus of claim 10, said means for closing said clamp comprising a first cam secured to conveyor frame and located to contact said second roller of each clamp as it passes by to close said clamp and grip an unlabelled folder and said means for opening said clamp comprising a second cam secured to conveyor frame and located to contact said second roller of each clamp as it passes by to open said clamp and release a labelled folder.

12. In apparatus of claim 11, said lower cam segment having a ramp portion which engages said roller, said ramp being inclined at an angle in the range of 10° to 35°.

13. In apparatus of claim 12, said ramp being inclined at 25°.

14. In apparatus of claim 12, an apex defining the juncture between lower and upper cam segments.

15. In apparatus of claim 14, said upper cam having an arcuate outline corresponding in shape to periphery of said roller.

* * * * *